(12) United States Patent
Weber

(10) Patent No.: US 8,960,341 B2
(45) Date of Patent: Feb. 24, 2015

(54) CONTINUOUSLY VARIABLE ELECTRIC DRIVE MODULE FOR ELECTRIC VEHICLES

(71) Applicant: James L. Weber, West Bloomfield, MI (US)

(72) Inventor: James L. Weber, West Bloomfield, MI (US)

(73) Assignee: Magna E-Car Systems of America, Inc., Aurora, Ontario (CA)

( * ) Notice: Subject to any disclaimer, the term of this patent is extended or adjusted under 35 U.S.C. 154(b) by 0 days.

(21) Appl. No.: 14/142,342

(22) Filed: Dec. 27, 2013

(65) Prior Publication Data

US 2014/0182954 A1    Jul. 3, 2014

Related U.S. Application Data

(60) Provisional application No. 61/746,202, filed on Dec. 27, 2012.

(51) Int. Cl.
| | |
|---|---|
| *B60K 1/00* | (2006.01) |
| *B60K 17/16* | (2006.01) |
| *B60K 1/02* | (2006.01) |
| *B60K 7/00* | (2006.01) |
| *H02K 7/116* | (2006.01) |

(52) U.S. Cl.
CPC . *B60K 17/16* (2013.01); *B60K 1/02* (2013.01); *B60K 7/0007* (2013.01); *Y10S 903/918* (2013.01); *B60K 1/00* (2013.01); *H02K 7/1163* (2013.01); *B60K 2001/001* (2013.01); *B60K 2007/0046* (2013.01); *B60K 2007/0061* (2013.01)
USPC ......... 180/65.7; 180/65.1; 180/65.6; 903/918

(58) Field of Classification Search
CPC .............. B60K 1/00; B60K 6/20; B60K 7/00
USPC ................ 180/65.7, 65.6, 65.1, 65.51, 65.31
See application file for complete search history.

(56) References Cited

U.S. PATENT DOCUMENTS

| | | | |
|---|---|---|---|
| 3,799,284 A * | 3/1974 | Hender ...................... 180/65.25 |
| 5,396,968 A * | 3/1995 | Hasebe et al. ............... 180/65.6 |
| 5,443,130 A * | 8/1995 | Tanaka et al. ................ 180/65.6 |
| 5,713,813 A * | 2/1998 | von Greyerz ................. 475/257 |
| 6,401,850 B1 | 6/2002 | Bowen |
| 6,579,201 B2 * | 6/2003 | Bowen .............................. 475/5 |
| 6,732,827 B2 * | 5/2004 | San Miguel .................. 180/242 |
| 6,973,783 B1 * | 12/2005 | Hauser et al. .................... 60/484 |
| 7,112,155 B2 * | 9/2006 | Keuth ................. 475/6 |
| 7,247,117 B2 | 7/2007 | Forster |
| 7,497,286 B2 | 3/2009 | Keller et al. |
| 7,867,125 B2 | 1/2011 | Kim et al. |
| 7,900,447 B1 * | 3/2011 | Hauser et al. ................... 60/484 |
| 8,403,088 B2 | 3/2013 | Knoblauch et al. |
| 8,424,625 B2 * | 4/2013 | Ishii ............. 180/65.31 |
| 8,556,760 B2 | 10/2013 | Mack et al. |
| 8,585,525 B2 * | 11/2013 | Ushiroda et al. ............. 180/65.6 |
| 8,640,800 B2 * | 2/2014 | Armbruster et al. ......... 180/65.6 |
| 2005/0124451 A1 * | 6/2005 | Morikawa .......................... 475/6 |
| 2010/0025131 A1 | 2/2010 | Gloceri et al. |

* cited by examiner

*Primary Examiner* — Hau Phan
(74) *Attorney, Agent, or Firm* — Dickinson Wright PLLC

(57) ABSTRACT

An electric drive module for use in electric vehicles includes a first electric motor, a second electric motor, a continuously-variable gearbox assembly interconnecting the first and second electric traction motors to a pair of wheels, and a third electric motor for controlling a direction and rotary speed of a component of the gearbox assembly so as to continuously vary a speed ratio between the wheels.

20 Claims, 5 Drawing Sheets

CONTINUOUSLY VARIABLE ELECTRIC DRIVE MODULE FOR ELECTRIC VEHICLES

CROSS REFERENCE TO RELATED APPLICATIONS

The present application claims priority to U.S. Provisional Patent Application Ser. No. 61/746,202, entitled "Continuously Variable Electric Drive Module for Electric Vehicles" and filed on Dec. 27, 2012, the entire disclosure incorporated herein by reference.

FIELD

The present disclosure relates generally to vehicles that are powered at least partly by an electric drive module having a pair of electric traction motors and a planetary gearset and, more particularly, to an electric drive module having a pair of independently controllable traction motors interconnected by an electrically-controlled continuously variable gearset.

BACKGROUND

This section provides background information related to the present disclosure which is not necessarily prior art.

The automobile industry is actively working to develop alternative powertrains in an effort to significantly reduce or eliminate the emissions exhausted into the air by conventional powertrains equipped with an internal combustion engine. Significant development has been directed toward electric vehicles (EV) that are equipped with one or more electric traction motors. For example, some electric vehicles are only powered by the electric motor(s) and rely solely on the electrical energy stored in an on-board battery pack. However, some other electric vehicles, commonly referred to as hybrid electric vehicles (HEV), have both an internal combustion engine and one or more traction motors.

There are two types of hybrid electric vehicles, namely, series hybrid and parallel hybrid. In series hybrid electric vehicles, tractive power is generated and delivered to the wheels by the electric traction motor(s) while the internal combustion engine is used to drive a generator for charging the battery pack. In parallel hybrid electric vehicles, the traction motor(s) and the internal combustion engine work independently or in combination to generate and deliver tractive power to the wheels.

Various types of electric and hybrid powertrain arrangements are currently being developed. For example, some electric vehicles are equipped with wheel-mounted electric traction motor/gearbox assemblies. In such an arrangement, a fixed-ratio gear reduction is provided between the traction motor and the driven wheel hub. In other arrangements, an electric drive module (EDM) is used to generate and deliver tractive power to a pair of wheels. The electric drive module may include an electric traction motor, a final drive assembly including a differential unit that is adapted for connection to the wheels, and a reduction gearset directly coupling an output component of the traction motor to an input component of the differential unit. The reduction gearset may be based on a layshaft configuration or a planetary configuration for the purpose of providing a desired speed reduction and torque multiplication between the traction motor and the differential unit. Thus, the electric drive module is essentially a single-speed or "direct drive" transaxle that can be adapted to drive either the front wheels or the rear wheels of the vehicle.

In some other electric or hybrid vehicles, the electric drive module can include a pair of electric traction motors each mounted in-board of the wheel and having a gear reduction unit coupled to drive an axleshaft for transmitting tractive power to the wheel. These traction motors can be independently controlled to distribute balanced power and traction to each wheel without concern for inter-wheel slip associated with conventional EDM's equipped with a differential unit. In a vehicle equipped with such a "dual motor" electric drive module, this balancing of power and traction can provide side-to-side (i.e., "left-to-right") control in either of a front wheel drive (FWD) or rear wheel drive (RWD) vehicular configuration. Alternatively, electric drive modules can be used at both the front and rear of the vehicle to provide four independently controllable traction motors and generate balanced power and traction for both left-to-right and front-to-rear control to establish a four-wheel drive (4WD) vehicular configuration. Such dual motor electric drive modules typically include fixed-ratio gearsets between the traction motor and the axleshaft. Fixed-ratio gearsets may, however, require a compromise between low end torque and top end speed as well as the need to utilize larger motors to accommodate all torque and speed requirements.

In view of the above, it would be beneficial to provide technology that addresses and overcomes these issues so as to facilitate the design and manufacture of electric drive vehicles that are in electric vehicles having optimized power and traction delivery characteristics.

SUMMARY

This section provides a general summary of the disclosure, and is not a comprehensive disclosure of its full scope or all of its features.

According to an aspect of the present disclosure, an electric drive module (EDM) for a vehicle is disclosed. The vehicle may include a pair of first wheels, a pair of second wheels, an energy (i.e., battery) management system and a vehicle control system. The EDM may be configured to provide tractive power to either of the first wheels or the second wheels and can include a first electric traction motor, a second electric traction motor, and a continuously variable gearset interconnected between the first and second electric traction motors.

In accordance with one embodiment of the EDM, the first electric traction motor is adapted to drive one of the first wheels and the second electric traction motor is adapted to drive the other one of the first wheels to establish a rear wheel drive (RWD) electric vehicle.

In accordance with another embodiment of the EDM, the first electric traction motor is adapted to drive one of the second wheels and the second traction electric motor is adapted to drive the other one of the second wheels to establish a front wheel drive (FWD) electric vehicle.

In accordance with another aspect, a first EDM is configured and arranged to drive the pair of first wheels while a second EDM is configured and arranged to drive the pair of second wheels, thereby establishing a four-wheel drive (4WD) electric vehicle.

In accordance with these and other aspects, features and advantages, the EDM of the present disclosure may include a first electric traction motor having a first tubular or hollow rotor shaft; a second electric traction motor having a second tubular or hollow rotor shaft; and a continuously variable gearset. The continuously variable gearset may include a first sun gear fixed for rotation with the first tubular rotor shaft; a first carrier fixed for rotation with a first output shaft extending through the first tubular rotor shaft; a plurality of first planet gears rotatably supported by the first carrier and which are meshed with the first sun gear; a second sun gear fixed for rotation with the second rotor shaft; a second carrier fixed for rotation with a second output shaft extending through the second rotor shaft; a plurality of second planet gears rotatably supported by the second carrier and which are meshed with the second sun gear; and a common ring gear unit having a first ring gear meshed with the first planet gears and a second right gear meshed with the second planet gears. The first output shaft may be coupled via a first axleshaft and first CV joints to one of the wheels while the second output shaft may be coupled via a second axleshaft and second CV joints to the other one of the wheels. A third electric motor or gearbox drive motor is provided for controlling the rotary direction, the speed of rotation and/or the braking of a common ring gear unit. The electric gearbox drive motor is configured to surround the common ring gear unit and allows the entire EDM to be enclosed in a common housing assembly. This ability to independently control rotation of the common ring gear unit relative to the rotary speeds and/or directions of the first and second rotor shafts facilitates a continuously variable gear ratio between the first traction motor and the first output shaft as well as between the second traction motor and the second output shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The present disclosure is generally related to integration of a pair of electric traction motors and a continuously variable gearbox into an electric drive module (EDM) which is adapted for use in electric vehicles (EV) or hybrid electric vehicles (HEV) for generating and delivering tractive power (i.e., drive torque) to a pair of ground-engaging wheels. Integration of the traction motors and the continuously variable gearbox into a common housing permits use of the electric drive module as an inboard or axle drive system that can be configured to replace an otherwise conventional axle assembly. Accordingly, several exemplary embodiments of electric drive modules will hereinafter be described in sufficient detail to permit those skilled in the art to comprehend and appreciate the enhanced structural and functional features and operational characteristic associated with the teachings of the present disclosure.

Figure 1:
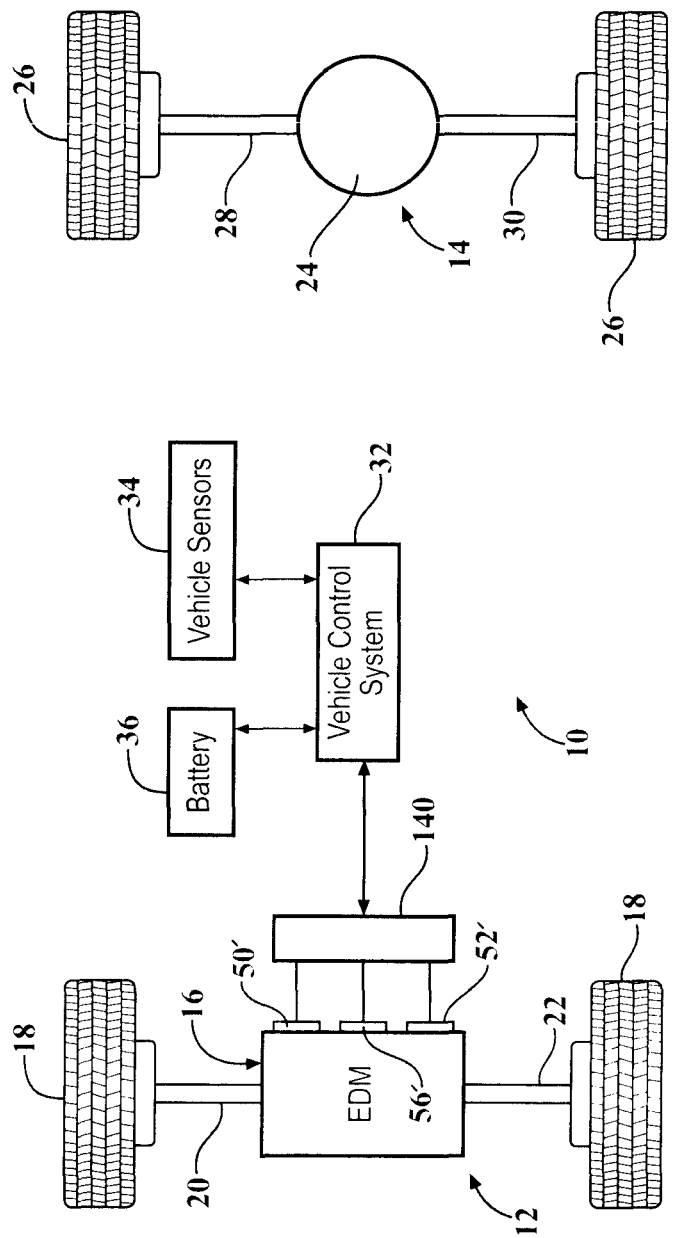
FIG. 1 is a schematic illustration of a powertrain and control system associated with an electric vehicle equipped with an electric drive module (EDM) constructed in accordance with the teachings of the present disclosure.

Referring initially to FIG. 1, an exemplary powertrain arrangement for an electric vehicle 10 is shown to include a first powered driveline assembly 12 and a second non-powered driveline assembly 14. First driveline assembly 12 includes an electric drive module (EDM) 16 which is operatively coupled to drive or be driven by a pair of first ground-engaging wheels 18 via a pair of first axleshafts 20 and 22. Second driveline assembly 14 may include an axle assembly having a differential unit 24 operatively coupled to a pair of second ground-engaging wheels 26 via a pair of second axleshafts 28 and 30. In accordance with the present teachings, powered driveline assembly 12 may be arranged as either the front or rear driveline of electric vehicle 10. Electric vehicle 10 is also shown to include a vehicle control system 32, a set of vehicle sensors 34 and an energy (i.e., battery) management system 36.

Figure 2:
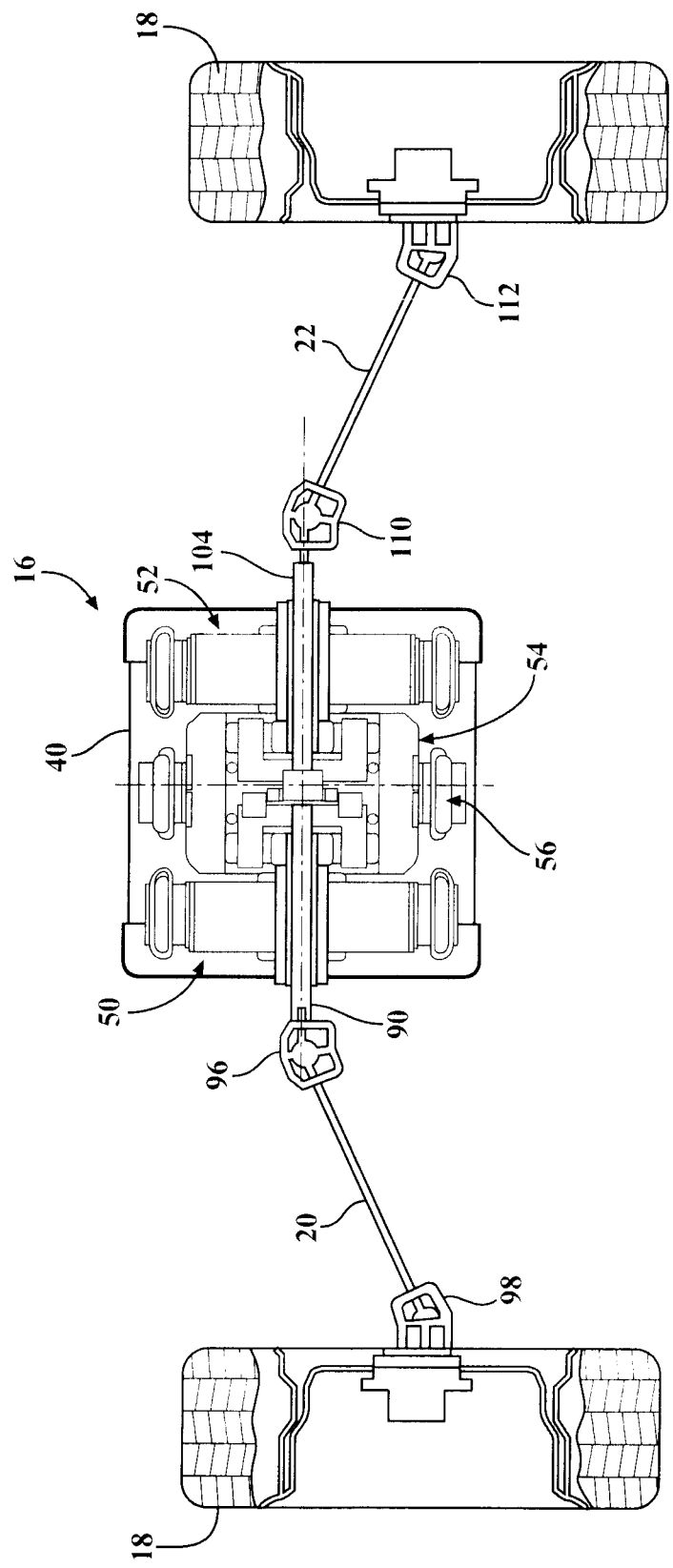
FIG. 2 is an illustration of the EDM drivingly interconnected to a pair of front wheels.
Figure 3:
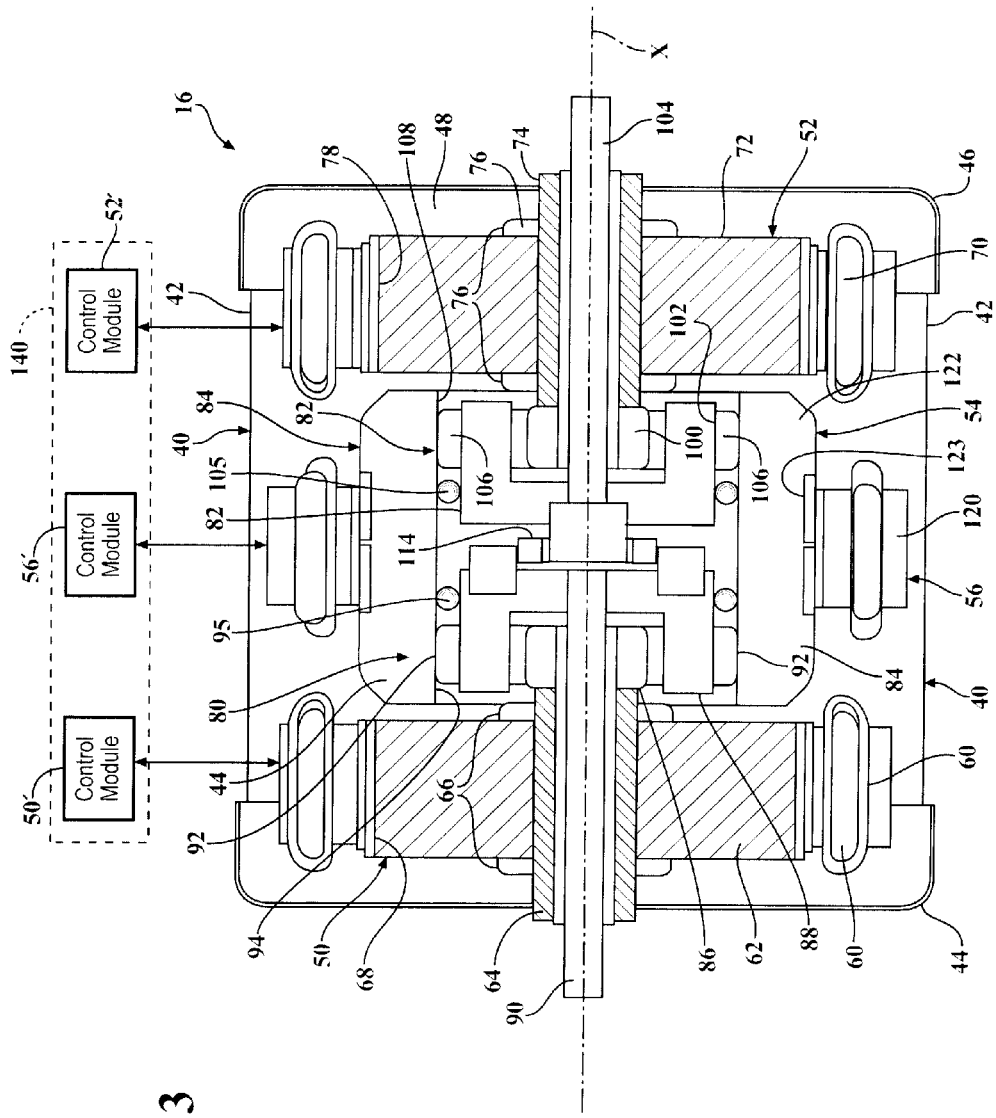
FIG. 3 is an enlarged portion of FIG. 2 showing the EDM in greater detail.

Referring now to FIGS. 2 and 3, an exemplary construction for electric drive module 16 of FIG. 1 is shown. In general, EDM 16 includes a multi-piece housing 40 having a central drum 42 and first and second end caps 44, 46 which together define an internal motor/gearbox chamber 48. EDM 16 further includes a first electric traction motor 50, a second electric traction 52, a dual-planetary or continuously-variable gearbox assembly 54, and an electric gearbox drive motor 56, each of which is disposed within chamber 48. First electric traction motor 50 includes a first non-rotary stator 60, a first rotor 62 located for rotation relative to stator 60 about a common rotary axis "X", and a first tubular rotor shaft 64 extending from the first end cap 44 of the housing 40 and through the first rotor 62. As best shown in FIG. 3, the first tubular rotor shaft 64 is fixed to the first rotor 62 and is supported by first rotor bearings 66 for allowing rotation of the first rotor 62 within the housing 40. As also best shown in FIG. 3, the first rotor 62 includes at least one first rotor magnet 68 disposed adjacent its outer diameter to establish rotation of the first rotor 62 when the first non-rotary stator 60 is actuated.

Second electric traction motor 52 is substantially similar to first traction motor 50 and includes a second non-rotary stator 70, a second rotor 72 located for rotation relative to second non-rotary stator 70 about the common rotary axis "X", and a second tubular rotor shaft 74 extending from the second cap end 46 of the housing 40 and through the second rotor 72. As best shown in FIG. 3, the second tubular rotor shaft 74 is fixed to the second rotor 72 and is supported by second rotor bearings 76 for allowing rotation of the second rotor 72 within the housing 40. As also best shown in FIG. 3, the second rotor 72 includes at least one second rotor magnet 78 disposed adjacent its outer diameter to establish rotation of the second rotor 72 when the first non-rotary stator 70 is actuated. Rotor shafts 64, 74 are aligned with housing 40 for rotation about a common rotary axis "X".

Dual-planetary or continuously-variable gearbox assembly 54 is disposed between first traction motor 50 and second traction motor 52 and generally includes a first planetary gear assembly 80 and a second planetary gear assembly 82 interconnected via a common ring gear unit 84. As best shown in FIG. 3, the common ring gear unit 84 is disposed in surrounding relationship with the first and second planetary gearbox assemblies 80, 82. First planetary gear assembly 80 includes a first sun gear 86 interconnected to and thus fixed for rotation with first tubular rotor shaft 64, a first carrier 88 fixed for rotation with a first output shaft 90, a plurality of first planet gears 92 rotatably supported from first carrier 88, and a first ring gear 94 formed on or fixed to common ring gear unit 84. First planet gears 92 are meshed with first sun gear 86 and first ring gear 94, and the first carrier 88 is supported by first carrier bearings 95 for rotation about the common ring gear unit 84. As best shown in FIG. 3, the first sun gear 86 has a tubular shape that corresponds to the tubular or hollow shape of the first tubular rotor shaft 64, and the first output shaft 90 extends through the interior cavities defined by both of the first sun gear 86 and the first tubular rotor shaft 64, and outwardly from the first tubular rotor shaft 64 to a first end of first axleshaft 20. Thus, the first sun gear 86 is disposed inwardly of the first rotor 62 and the first output shaft 90 is rotatably disposed within the first tubular rotor shaft 64 and the first sun gear 86 between the first carrier 88 and the first end cap 44 of the housing 40. As best shown in FIG. 2, the first output shaft 90 extends out of the first tubular rotor shaft 64 along the common rotary axis "X" and is fixed to the first end of first axleshaft 20 via CV joint 96. A second CV joint 98 connects a second end of first axleshaft 20 to one of the first wheels 18. First output shaft 90 is aligned for rotation about common rotary axis "X" relative to the first rotor shaft 64.

Second planetary gear assembly 82 includes a second sun gear 100 interconnected to and thus fixed for rotation with second tubular rotor shaft 74, a second carrier 102 fixed for rotation with a second output shaft 104, a plurality of second planet gears 106 rotatably supported from second carrier 102, and a second ring gear 108 formed on or fixed to common ring gear unit 84. Thus, the common ring gear unit 84 interconnects, and thus is shared by, both of the first and second ring gears 94, 108. Second planet gears 106 are meshed with second sun gear 100 and second ring gear 108, and the second carrier 102 is supported by second carrier bearings 105 for rotation about the common ring gear 84. As best shown in FIG. 3, the second sun gear 100 has a tubular or hollow shape that corresponds to the tubular shape of the second tubular rotor shaft 74, and the second output shaft 104 extends through the interior cavities defined by both of the second sun gear 100 and the second tubular rotor shaft 74, and outwardly from the first tubular rotor shaft 74 to a first end of second axleshaft 22. Thus, the second sun gear 100 is disposed inwardly from the second rotor 72 and second output shaft 104 is rotatably disposed within the first tubular rotor shaft 74 and the first sun gear 100 between the second carrier 102 and the second end cap 46 of the housing. As best shown in FIG. 2, second output shaft 104 extends out of second tubular rotor shaft 74 along the common rotary axis "X" and is fixed to a first end of second axleshaft 22 via CV joint 110. A second CV joint 112 connects a second end of second axleshaft 22 to the other one of first wheels 18. Second output shaft 104 is aligned for rotation about the common rotary axis "X" relative to second rotor shaft 74. As best shown in FIG. 3, central thrust bearing 114 is provided between, and thus shared by, the first carrier 88 and the second carrier 102. In view of the above, it is noted that the first and second planetary gear assemblies 80, 82 share a housing 40, a ring gear unit 84, and a thrust bearing 114. This shared arrangement between the first and second planetary gear assemblies 80, 82 leads to cost, complexity, and weight reductions for the EDM.

Electric gearbox drive motor 56 includes a third non-rotary stator 120 and a third rotor 122 that is fixed for rotation with common ring gear unit 84. As best shown in FIG. 3, at least one ring gear magnet 123 is disposed within the common ring gear unit 84 about an outer diameter of the common ring gear unit 84. As a result, the at least one ring gear magnet 123 is surrounded by the third non-rotary stator 120. The at least one ring gear magnet 123 allows the third non-rotary stator 120 to establish rotation of the common ring gear unit 84 about the common rotary axis "X" when the third non-rotary stator 120 is actuated. As a result, the electric gearbox motor 56 is configured and arranged to control the direction of rotation of common ring gear unit 84, the rotary speed of common ring gear unit 84, and the braking of common ring gear unit 84. Independent control of the electric gearbox drive motor 56, the first traction motor 50 and second the traction motor 52 facilitates variable torque and speed control between first tubular rotor shaft 64 and first output shaft 90 in relation to second tubular rotor shaft 74 and second output shaft 104. Put another way, independent actuation of the electric gearbox drive motor 56, the first traction motor 50 and the second traction motor 52 also facilitates independent rotation of the first tubular rotor shaft 62, second tubular rotor shaft 74, and the common gear ring unit 84 about the common rotary axis "X" to establish variable torque and speed control ratios between the first output shaft 90 and the second output shaft 104. As such, the first and second electric traction motors 50, 52 can be controlled with independent speed and torque, but their rations adjust together as needed through the rotation of the common gear ring unit 84. Put another way, when the common ring gear unit is rotated, it causes the rations of the independent controlled motors to change equally, always creating the exact same ration for both independently control motors. Accordingly, optimum power and traction can be delivered to each of first wheels 18 to accommodate variable road conditions, driving maneuvers, braking conditions, and anticipated performances and handling requirements. The net result is an EDM 16 that can be equipped with smaller traction motors while delivering improved lower end torque and higher top end speed characteristic when compared to an EDM equipped with a fixed-ratio gear reduction unit.

Referring again to FIG. 1 in association with FIG. 3, a power electronics unit 140 is shown electrically connected to, and thus in electrical communication with, control modules 50', 52', and 56', which each are electrically connected to their respective electric motors 50, 52 and 56. Power electronics unit 140 can include, for example and without limitation, a triple inverter-controller unit that is arranged to communicate with vehicle control system 32 and supply the desired electrical command signals to each of the respective motor control modules. As will be understood, the specific configuration of the control circuits, systems and algorithms required to coordinate operation of EDM 16 can include any control systems adapted for use with electric vehicles.

Figure 4:
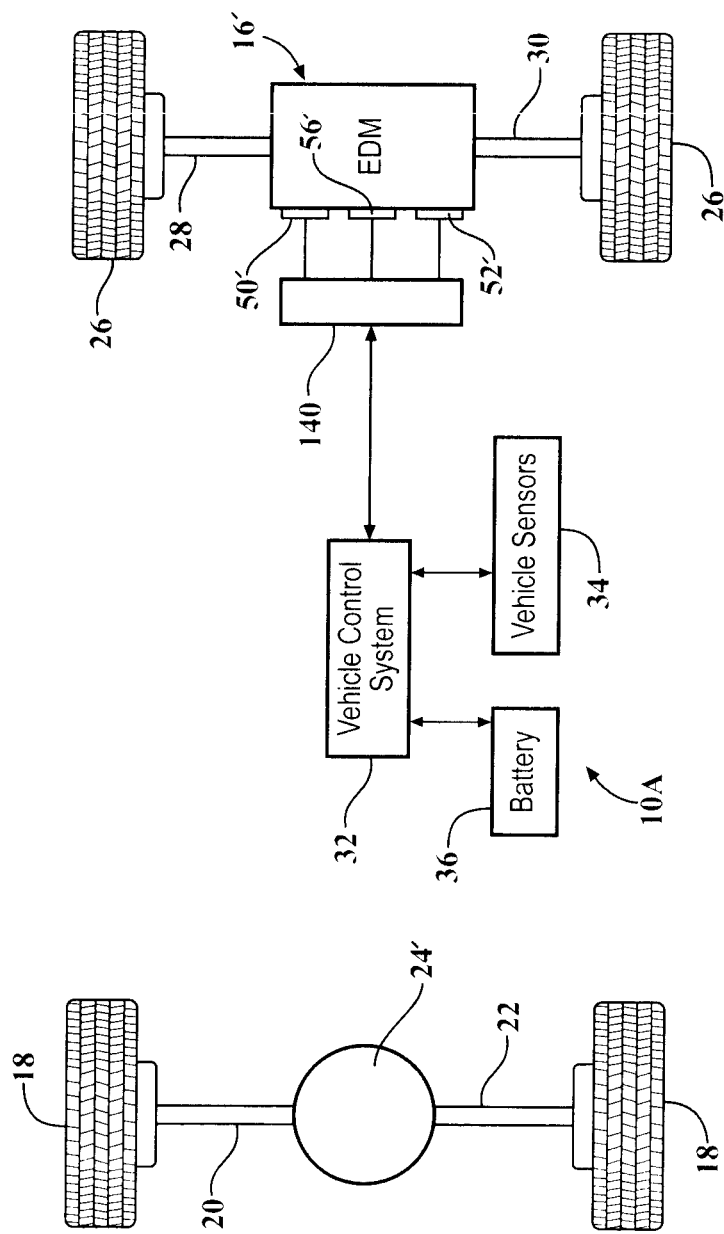
FIG. 4 is a schematic illustrating the EDM arranged to drive the rear wheels of the vehicle.
Figure 5:
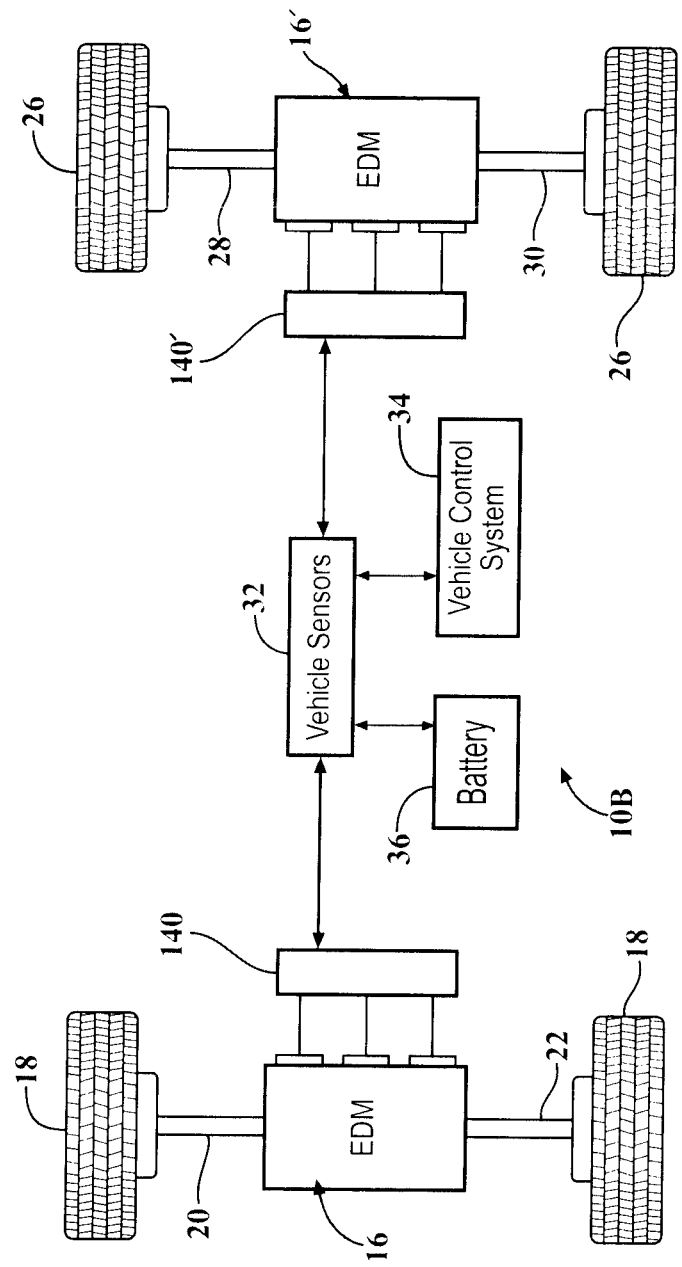
FIG. 5 is a schematic illustrating a first EDM arranged to drive the front wheels and a second EDM arranged to drive the rear wheels.

FIG. 4 is generally similar to FIG. 1 except that an EDM 16A is now shown in association with rear wheels 26 to establish a RWD electric vehicle 10A. EDM 16A is generally identical in structure and function to EDM 16 of FIG. 1. FIG. 5 illustrates a 4WD electric vehicle 10B equipped with EDM 16 of FIG. 1 and EDM 16A of FIG. 4. In such an arrangement, front wheels 18 and rear wheels 26 can be independently controlled with the continuously-variable gearbox assembly 59 and drive motor 56 providing enhanced left-to-right and front-to-rear traction and speed control.

Those skilled in the art will understand that any suitable type of electric motors capable of use in electric vehicles are contemplated for use as traction motors 50 and 52. Traction motors 50 and 52 can be sized to accommodate the torque and energy requirements of vehicle 10. Moreover, the side-to-side and front-to-rear torque and speed controls provided by EDM 16 (and EDM 16A) permits use of different control algorithms based on weight distribution of vehicle 10 so as to further optimize tractive performance.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive module for driving a pair of wheels of a vehicle, comprising:
   first and second output shafts adapted for connection to the pair of wheels;
   a first electric motor having a first rotor;
   a second electric motor having a second rotor;
   a gearbox assembly disposed between the first and second electric motors, the gearbox assembly including a first sun gear fixed for rotation with the first rotor, a first carrier fixed for rotation with the first output shaft, a first ring gear, first planet gears rotatably supported by the first carrier and meshed with the first ring gear and the first sun gear, a second sun gear fixed for rotation with the second rotor, a second carrier fixed for rotation with the second output shaft, a second ring gear, and second planet gears rotatably supported by the second carrier and meshed with the second sun gear and the second ring gear, and a common ring gear unit interconnecting the first ring gear and the second ring gear;
   a third electric motor configured to rotate the common ring gear unit of the gearbox assembly to establish common rotation of the first ring gear and the second ring gear; and
   a control system electrically connected to the first, second and third electric motors and being operable to independently control actuation of the first, second and third motors for controlling a direction and speed of rotation of the common ring gear unit so as to vary a speed ratio between the first and second output shafts.

2. The electric drive module of claim 1, further including a housing assembly enclosing the first, second and third electric motors and the gearbox assembly.

3. The electric drive module of claim 2, wherein the housing includes a central drum and first and second end caps to collectively define an internal gearbox chamber, and the first, second, and third electric motors and the gearbox assembly are each disposed within the internal gearbox chamber.

4. The electric drive module of claim 2, wherein the first rotor is fixed to a first tubular rotor shaft and the second rotor is fixed to a second tubular rotor shaft, wherein the first sun gear and the second sun gear are tubular in shape, and wherein the first output shaft is rotatably disposed within both the first sun gear and the first tubular rotor shaft and the second output shaft is rotatably disposed within both the second sun gear and the second tubular rotor shaft.

5. The electric drive module of claim 4, wherein the first and second tubular rotor shafts are aligned for rotation about a common rotary axis.

6. The electric drive module of claim 4, wherein the first output shaft extends out of the first tubular rotor shaft and is interconnected to a first axleshaft associated with one of the wheels in the pair of wheels and the second output shaft extends out of the second tubular rotor shaft and is interconnected to a second axleshaft associated with the other of the wheels in the pair of wheels.

7. The electric drive module of claim 6, wherein the first tubular rotor shaft is supported by first rotor bearings and the second tubular rotor shaft is supported by second rotor bearings for rotation of the first and second tubular rotor shafts within the housing.

8. The electric drive module of claim 1, wherein the third electric motor is disposed in surrounding relationship with the common ring gear unit.

9. The electric drive module of claim 8, wherein the third electric motor includes at least one ring gear magnet disposed within the common ring gear unit and a non-rotary stator disposed in surrounding relationship with the at least one ring gear magnet to establish rotation of the common ring gear unit when the non-rotary stator is actuated.

10. The electric drive module of claim 1, wherein the common ring gear unit includes a central thrust bearing provided between the first carrier and the second carrier.

11. The electric drive module of claim 1, wherein the common ring gear unit includes the first ring gear and the second ring gear.

12. The electric drive module of claim 1, wherein the first carrier is supported by first carrier bearings and the second carrier is supported by second carrier bearings for rotation of the first and second planetary gear assemblies about the common ring gear unit.

13. An electric drive module for driving a pair of wheels of a vehicle, comprising:
   a first electric traction motor;
   a second electric traction motor;
   a continuously-variable gearbox assembly disposed between the first and second electric motors and including a first planetary gear assembly interconnected to the first electric traction motor and rotatable about a common rotary axis, a second planetary gear assembly interconnected to the second electric traction motor and rotatable about the common rotary axis, and a common ring gear unit disposed in surrounding relationship with and interconnecting both of the first and second gear assemblies and rotatable about the common rotary axis;
   an electric gearbox drive motor disposed configured to rotate the common ring gear unit about the common rotary axis; and
   a control system electrically connected to each of the first and second electric motors and the electric gearbox drive motors and configured to independently actuate the first and second electric motors and the electric gearbox drive motor for independently controlling rotation of the first planetary gear assembly, the second planetary gear assembly, and the common ring gear unit about the common rotary axis.

14. An electric drive module as set forth in claim 13, wherein the electric gearbox drive motor includes at least one ring gear magnet disposed within the common ring gear unit and a non-rotary stator disposed in surrounding relationship with the at least one ring gear magnet to establish rotation of the common ring gear unit when the non-rotary stator is actuated by the control system.

15. An electric drive module as set forth in claim 13, further including a housing which encloses the first and second electric traction motors and the continuously-variable gearbox assembly.

16. An electric drive module as set forth in claim 15, wherein the first electric traction motor includes a first rotor rotatable about the common rotary axis and the first planetary gear assembly includes a first sun gear disposed inwardly of the first rotor and fixed for rotation with the first rotor, and wherein the second electric motor includes a second rotor rotatable about the common rotary axis and the second planetary gear assembly includes a second sun gear disposed inwardly of the second rotor and fixed for rotation with the second rotor.

17. An electric drive module as set forth in claim 16, further comprising a first tubular rotor shaft interconnecting the first rotor to the first sun gear and extending between the first rotor from the first sun gear and a first end of the housing, and a second tubular rotor shaft interconnecting to the second rotor to the second sun gear and extending through the second rotor between the second sun gear and a second end of the housing.

18. An electric drive module as set forth in claim 17, wherein the first and second sun gears are tubular, and a first output shaft is rotatably disposed within the first sun gear and the first tubular rotor shaft along the common rotary axis and is interconnected to a first axleshaft for rotating one of the wheels in the pair of wheels and a second output shaft is rotatably disposed within the second sun gear and the second tubular rotor shaft along the common rotary axis and is interconnected to a second axleshaft for rotating the other of the wheels in the pair of wheels.

19. An electric drive module as set forth in claim 18, wherein the first planetary gear assembly includes a first carrier fixed for rotation with the first output shaft and first planet gears rotatably supported by the first carrier, the second planetary gear assembly includes a second carrier fixed for rotation with the second output shaft and second planet gears rotatably supported by the second carrier, and the common ring gear unit includes first and second ring gears meshed with the respective first and second planet gears of the first and second carriers for establishing common rotation of the first and second ring gears about the common rotary axis.

20. An electric drive module as set forth in claim 19, the first carrier is supported by first carrier bearings and the second carrier is supported by second carrier bearings for rotation of the first and second planetary gear assemblies about the common ring gear unit.

* * * * *